E. E. BROWN.
FRICTION CLUTCH.
APPLICATION FILED NOV. 29, 1918.
1,306,465.
Patented June 10, 1919.
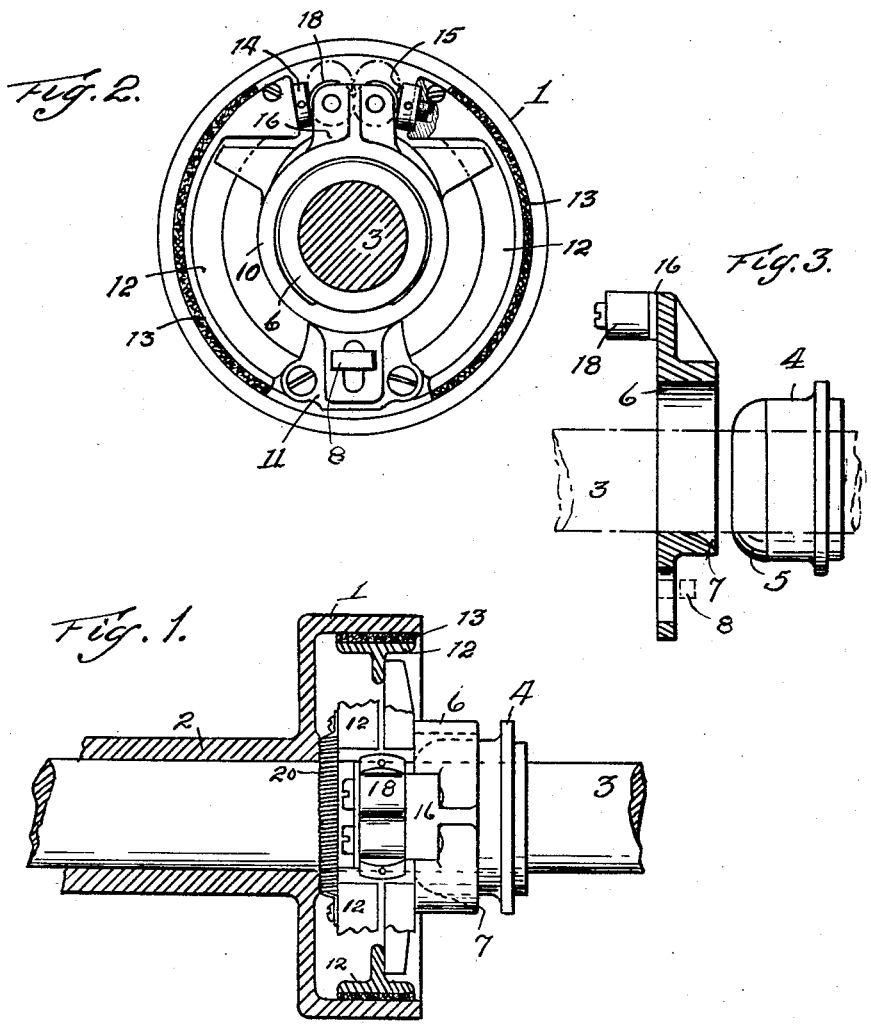
Ellis E. Brown, Inventor
By
Attorney

UNITED STATES PATENT OFFICE.

ELLIS E. BROWN, OF READING, PENNSYLVANIA.

FRICTION-CLUTCH.

1,306,465.  Specification of Letters Patent.  Patented June 10, 1919.

Application filed November 29, 1918. Serial No. 264,543.

*To all whom it may concern:*

Be it known that I, ELLIS E. BROWN, a citizen of the United States, residing at Reading, in the county of Berks and State of Pennsylvania, have invented certain new and useful Improvements in Friction-Clutches, of which the following is a specification.

This invention relates to improvements in friction clutches, and the object in the present invention is to provide a clutch in which positive clearance as between the clutch shoes and the clutch cup is insured, and one in which the maximum expansion is attained. A further object is to provide a device of this character in which the expansive movement is increased as the clutch shoes approach the limit of their outward action, and this rapidity of the clutch shoes at the point of maximum expansion is accomplished through the application of low leverage.

The invention contemplates an expanding device in which rollers are adapted to contact with inclined surfaces on the members to be expanded, and in which the shifting members are provided with tapered contacting surfaces.

The invention is more fully described in the following specification and clearly illustrated in the accompanying drawing, in which:—

Figure 1 is a central, longitudinal sectional view of my clutch.

Fig. 2 is a front elevational view thereof, and

Fig. 3 is a plan view, partly in section.

The numeral 1 designates the clutch cup, which I have shown formed with an integral sleeve 2. 3 designates the shaft and 4 the shifting member. This shifting member is formed with a contacting edge 5, adapted to contact with the expanding member 6, and the contacting edge or surface is in the form of an arc, so that the action of the expanding member is increased in speed as the maximum of expansion is attained.

The expanding member 6 is formed with a tapered inner surface 7, at one point in its circumference, shown in the drawing as the lowermost point, and with a slotted guide depending from its body portion, and a pin 8 mounted on the clutch body on which this guide moves will serve as a limit stop for the expanding member.

The numeral 10 designates the clutch body, which surrounds the shaft, and has a depending portion 11 to which is pivoted the two clutch shoes 12, in oppositely disposed position, and the clutch shoes are each provided with a renewable friction surface member 13. Each shoe is also provided at its upper or free extremity, with an adjustable contacting member 14 whose bearing surfaces face each other, and which surfaces 15, are inclined toward the axial center of the shaft.

The expanding member 6 is formed with a lug 16 at its upper extremity, and on this lug I have mounted a pair of rollers 18, adapted to contact with each other, and each in turn adapted to contact with one of the inclined surfaces 15 on the shoes.

A coiled spring 20 holds together the free ends of the shoes and insures keeping them normally in closed position.

The action of the clutch is substantially as follows:

When the shifting member 4 is moved toward the clutch body, the arc on its contacting edge will contact with the tapered inner surface 7 of the member 6, and the continued movement of the member 4 will cause the member 6 to be drawn down toward the axial center. This downward movement will, through the contact of the rollers 18 with the inclined surfaces of the members 14, cause the shoes 12 to move outwardly on their pivotal connections with the clutch body, and cause the surfaces 13 of these shoes to contact with the inner wall of the cup 1.

It will be noted that the relatively low leverage, in connection with the peculiar action of the shifting member 4 in increasing the expanding movement as it attains or approaches the limit of said movement, will insure that peculiar effectiveness desired in devices of this character, and that the reverse movement of said shifting member will insure that clearance which will insure positively against any "drag."

Having thus fully described my invention, I claim:—

1. The combination, in a clutch device, of a clutch cup formed with an integral sleeve, of a clutch body having a depending portion centrally disposed, two oppositely disposed clutch shoes pivotally mounted on said depending portion, each of which shoes is provided with a renewable friction surface member, an adjustable contacting member located in the free end of each shoe, a transversely shiftable expanding member and a slotted guide depending from its body portion, a limit stop on which said guide travels, rollers carried by said expanding member and adapted to contact with each other and with the inclined surfaces of the adjustable contact members, and a sliding member having a rounded surface adapted to engage and shift the expanding member.

2. In a clutch, the combination of a body, a pair of clutch shoes pivotally mounted on the body, each shoe having an adjustable member in its free end, said members having inclined surfaces, a transversely shiftable expanding member mounted on the body and provided with two rollers adapted to contact with the inclined surfaces of said adjustable members, said expanding member having a portion of its inner surface tapered, a slotted guide formed on the expanding member, a pin on the clutch body in engagement with the guide and adapted to limit the movement of the expanding member, and a shifting member formed with a rounded edge adapted to engage the tapered surface on the expanding member.

In testimony whereof I affix my signature.

ELLIS E. BROWN.

Copies of this patent may be obtained for five cents each, by addressing the "Commissioner of Patents, Washington, D. C."